Oct. 11, 1955  W. J. PATTISON  2,720,313
LIQUID PURIFICATION SYSTEM
Filed Dec. 3, 1951

WILLIAM J. PATTISON,
INVENTOR.

BY John H. J. Wallace

United States Patent Office 2,720,313
Patented Oct. 11, 1955

2,720,313

LIQUID PURIFICATION SYSTEM

William J. Pattison, Santa Monica, Calif., assignor to The Garrett Corporation, Los Angeles, Calif., a corporation of California Application December 3, 1951, Serial No. 259,562

3 Claims. (Cl. 210—152)

This invention relates generally to a fuel purification system and more particularly to an aircraft fuel system wherein contaminating materials may be removed from the fuel prior to the injection of the fuel into an aircraft engine.

While this system is primarily for use in aircraft it should be understood that the system is equally applicable to other types of engines and engine driven devices, whether these engines be of the reciprocating type or turbine type. The system is also applicable to the purification of oil in lubrication systems.

Much difficulty has been experienced in the operation of aircraft engines due to the presence of foreign materials such as dust, rust, scale, grit, water and other materials in aircraft fuels. Contemporary fuel injection nozzles and positive displacement pumps are extremely sensitive even to very small particles of foreign materials in the fuel, and it is difficult, if not practically impossible, to transport fuel, especially over great distances, without collecting these materials in the fuel. The fuel may also contain as much as two to three per cent water, collected in the tanks by condensation, and in an aircraft carrying a large quantity of fuel, this amounts to considerable water which should be removed prior to flight, since it is desirable that the maximum number of B. t. u.'s per pound of fuel be carried during flight. In-flight removal of this water by a filter of sufficiently fine mesh to remove all undesirable solid matter entails a filter susceptible to clogging by the freezing of the accumulated water at high altitudes or whenever low temperature conditions are encountered.

Aircraft engines of the turbo-jet type require as much as 50 gallons of fuel per minute in high speed operation. Large micronic particle removing fuel filters are commonly used to solve this problem. These filters remove water, and since the filter must be installed on the upstream side of the engine fuel pump (to protect the pump from damage by abrasive materials contained in the fuel) and also since the filter must be of the "full flow" type to accommodate the large fuel flow necessary for turbojet type aircraft engines, serious difficulties are encountered when the water collected by the filter is exposed to freezing temperatures. Filter by-passes have been provided; however, when the filter becomes frozen up, the by-pass may not operate and, even so, will supply unfiltered, dirt and water contaminated fuel to the engine. In certain applications, a dual filter has been provided as a protection, and a shuttle valve, which diverts the flow from one-half of the filter element to the other half, enables the filter which has been iced up to be de-iced by hot air supplied from the engine. Accordingly, it is necessary that means other than filtering of the entire fuel flow be utilized to free the fuel of foreign materials.

Fuel heaters have been proposed to eliminate the filter icing problem. This solution, however, is not too practical because at high altitudes, with fuels having high vapor pressures, little or no fuel heating can be tolerated because of vapor lock considerations at the fuel pump inlet.

Aircraft engines frequently have also been provided with emergency fuel pumps to operate if the primary pumping system should fail. This additional equipment obviously adds undesirable weight to the aircraft.

Another problem in this connection is that of providing fuel pressures of 1200 p. s. i. or more over a pressure range variation of often as great as 60 to 1. Pumps capable of producing these ranges and pressures must necessarily be accurately made, hence any foreign material in the fuel will cause impairment of operation, serious damage or even failure of the pump.

It is therefore one object of this invention to provide a novel fuel purification system wherein foreign material including water may be removed from the full flow of fuel to an engine and in such a manner as to prevent ice formation in the system.

Another object of the invention is to provide a novel fuel purification system adapted for continuous uninterrupted operation through the use of self-cleaning, self-draining components.

Another object of the present invention is to provide a novel fuel purification system utilizing a continuous flow centrifugal type separator.

A further object of the invention is to provide a novel fuel purification system having suitable automatic controls for the efficient and reliable operation thereof.

Another object of the invention is to provide a novel means for automatically by-passing a cleansing filter, should the filter clog or fail to operate, and for returning contaminated fuel to a centrifugal separator to be recirculated therein, thus insuring a constant delivery of clean, dry fuel.

A still further object of the present invention is to provide a novel fuel purification system wherein the necessity for an emergency fuel pump is eliminated.

A further object of the invention is to provide a novel fuel purification system adapted to provide clean, dry fuel to a fuel pump for efficient operation thereof and to supplement the pressure produced by said pump.

A further object of the invention is to provide a novel, light weight, compact and efficient full-flow fuel purification system.

Other and further important objects and advantages of the invention will become apparent from the disclosure in the following specification and accompanying drawing, wherein.

Figure 1:
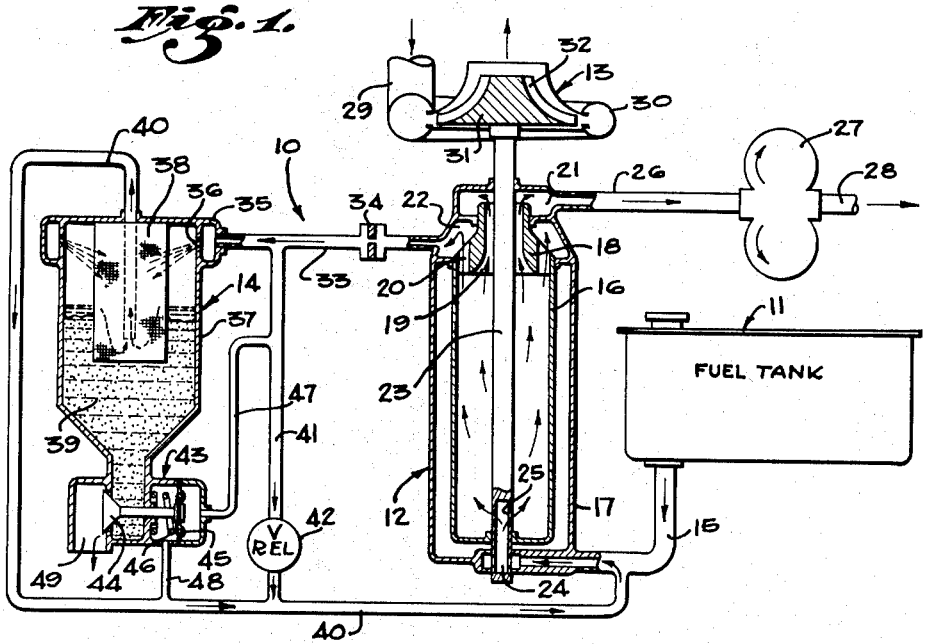
Fig. 1 is a schematic representation of the fuel purification system of this invention.

Referring to the drawing by reference characters, the fuel purification system of this invention is indicated schematically at 10 and includes generally, a fuel tank 11, a centrifugal separator 12, a driving means such as a turbine 13 for the separator, and a self-cleaning micronic filter 14.

Fuel such as gasoline, kerosene or the like is stored in the tank 11 to be delivered by a line 15 to the lower end entrance of the centrifugal separator 12. The separator 12 comprises an inner, vertically disposed, tubular rotating assembly 16 and a stationary outer casing 17 surrounding the assembly and spaced therefrom. The rotating assembly 16 has an upper closure 18 having centrally arranged passages 19 and outer passages 20. The passages 19 and 20 are upwardly directed, passage 19 communicating between the central area of the interior of the assembly 16 and an annular receptacle 21, the passages 20 communicating between the peripheral region of the interior of the assembly 16 and a second annular receptacle 22 positioned as shown, adjacent the receptacle 21. The rotating assembly 16 is adapted to be driven, at relatively high speeds, by means of the turbine airmotor 13 connected therewith by a shaft 23.

In the operation of the system thus far, fuel entering the separator 12, through the line 15, will be admitted into a passageway 24 in the lower end of the hollow shaft 23 to thereafter be delivered through orifices 25 to the interior of the rotating assembly 16. The rotation of the assembly 16, and the fuel contained therein, will cause heavy materials in the fuel, such as grit, sludge, water, etc. to be centrifugally disposed adjacent the outer wall of the assembly 16. The lighter portion of the fluid, being the clean, dry fuel, remains in the central region adjacent the shaft 23, to be delivered under pressure produced by the separator through passages 19 and into the receptacle 21. A discharge line 26 conducts the fuel to a gear type fuel pump 27 where the pressure is further raised to that suitable for engine use, and thence to a line 28 to thereafter be conducted to the engine fuel distribution system.

The turbine 13 may be driven from a suitable air supply, for example, by bleed air from a gas turbine compressor or supercharger. Air entering by duct 29 will be distributed within a scroll 30, to thereafter drive a rotor 31 having blades 32.

A relatively small portion of the total fuel flow through the separator, this portion containing the contaminating materials, is disposed adjacent the outer wall of the assembly 16 and will be forced through the passages 20, into the receptacle 22 to thereafter be conducted, by a line 33, to the self-cleaning filter 14. An orifice or restriction 34 may be provided in the line 33 adjacent the separator 12 to limit the flow through line 33.

The line 33 conducts the contaminated portion of the fuel into an annular manifold 35 arranged about the upper end of the filter 14. This portion of the fuel is then forced through scrubbing jets 36 in the wall 37 of the filter body, these scrubbing jets being downwardly directed against the outer surface of an inner filter element 38. The construction of the filter element is such as to remove all particles of sludge, dirt, and other contaminating materials, including water, from the fuel and to deposit these contaminants, as indicated at 39, in the lower portion of the filter body. The clean fuel is adapted to pass through the filter element 38 and into a discharge line 40, to thereafter be conducted to the fuel tank discharge line 15 and returned to the intake of the separator. This discharge from the filter will again pass through the separator to thereafter be delivered to the engine.

Inasmuch as only a small portion of the fuel flow passes through the filter, it has been found permissible to utilize a self-cleaning type. Aboard aircraft, weight and size considerations usually would prohibit the use of such a filter for the entire fuel flow. The action of the scrubbing jets on the filter element prevents, under normal conditions, the formation of ice thereon and assists in the discharge of contaminants from the filter.

Should the filter for any reason fail to operate, means are provided to by-pass the portion of the fuel containing the contaminants about the filter. This by-pass includes a line 41 interconnecting the separator discharge line 33 and the filter discharge line 40. A pressure relief valve 42 is positioned in the line 41 and is adjusted to open when the entrance pressure to the filter increases due to failure or stoppage of the filter. It may be seen therefore that even though the filter 14 should clog, the contaminated fuel will not be permitted to enter the high pressure pump or the engine but will merely be recirculated through the separator.

As previously mentioned, means are provided to periodically discharge the sludge 39 collected in the lower end of the filter body. This means includes a pressure responsive valve 43, arranged adjacent the lower end of the filter, having a valve member 44 connected to a diaphragm 45 and normally urged into closed position by a compression spring 46. The chambers on each side of the diaphragm 45 are connected through lines 47 and 48 to sense a pressure differential across the filter 14, line 47 being connected to by-pass line 41 and line 48 being connected to filter discharge line 40. It will therefore be seen that when the pressure differential across the filter 14, created by an excess of sludge 39 to thereby restrict the flow through the filter and to the line 40, becomes such as to overcome the force of the spring 46, the valve member 44 will be opened to discharge the sludge through a passage 49.

Figure 2:
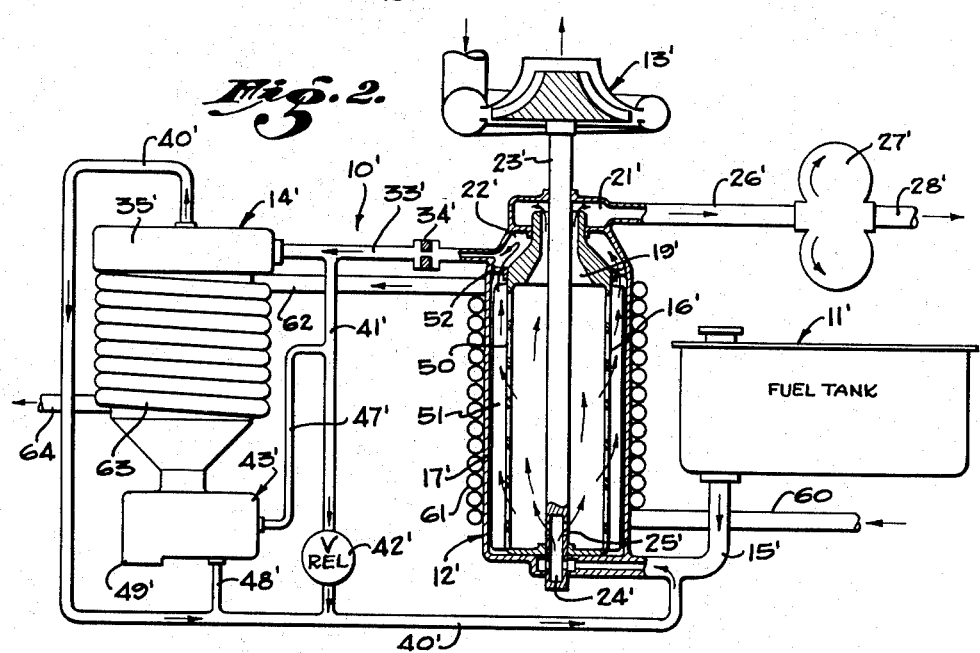
Fig. 2 is a schematic representation of a modified arrangement of the fuel purification system, that has particular utility in very cold climates or at high altitudes.

In Fig. 2 there is shown a modification of the present fuel purification system in which parts similar to those in Fig. 1 are indicated by like single primed reference numerals. In this modification a centrifugal separator 12' is of the self-cleaning type, an inner rotating assembly 16' being provided with peripheral openings 50 to deliver the heavier contaminating material to the space between the inner rotating assembly and an outer case 17'. Longitudinal, vertically disposed, peripheral blades or scrapers 51 are provided on the rotating assembly 16' within the space between the assembly 16' and the outer casing 17' to remove any material collected on the wall of the outer case 17'. In this modification the contaminants are adapted to pass through openings 52 adjacent the outer wall 17' and into a receptacle 22' to thereafter enter a separator discharge line 33'. The clean fuel will enter passages 19', adjacent a driving shaft 23', to be delivered to a receptacle 21', line 26', gear pump 27' and line 28' to the engine.

The contaminated portion of the fuel is conducted from the separator through the line 33' and delivered to the micronic filter 14' to therein be filtered. The filtered fuel is returned through a line 40' to the entrance of the separator. A dump valve 43', connected respectively by lines 47' and 48' to a by-pass line 41' and a filter discharge line 40', operates to periodically discharge sludge collected in the filter as previously described in connection with the system of Fig. 1.

It is often necessary, when operating aircraft in cold climates, to heat either the filter 14', the separator 12' or both. Therefore, means are provided to heat these components, said means comprising a conduit 60 adapted to deliver a heated substance such as, for example, hot lubricating oil removed from the engine, to a coil 61 disposed about the separator 12'. This oil may thereafter be conducted through a line 62 to a similar coil 63 about the filter 14' to thereafter be returned through a line 64 to an oil sump (not shown). It is to be understood, however, that dependent upon climatic and altitude conditions, it may be necessary or desirable to heat only the filter 14' or the separator 12' to remove any tendency for ice to form on the filter element or for wax-like emulsions in the fuel to congeal.

It will be recognized that this system is equally applicable to the removal of contaminants from fuel prior to its being placed in the tanks of aircraft. Thus only clean fuel would be loaded aboard an aircraft, but this procedure would not, however, obviate the desirability, under humid ground operational conditions, for the use of the present system in the aircraft for the removal of water condensate collected in the cold aircraft tanks after a return from a previous high altitude flight.

I claim:

1. In an engine fuel purification apparatus having a centrifuge for separating such fuel into a cleansed portion and a portion containing contaminants, a filter for receiving such contaminated portions, a first connection between said centrifuge and an inlet to said filter, a second connection for conducting a filtrate from an outlet of said filter to said centrifuge; a pressure responsive sludge discharge valve associated with said filter and comprising: a diaphragm connected to said valve; and spring means for biasing said valve toward a closed position, said diaphragm being exposed on one side to the pressure of fuel in said first connection and on the other side to the pressure of said filtrate in said second connection, whereby said sludge discharge valve will be opened to discharge sludge from said filter in response to a sludge-created increase in the pressure differential across said filter sufficient to overcome said spring means.

2. In an engine fuel purification apparatus of the type having a centrifuge for separating such fuel into a cleansed portion and a portion containing contaminants, a filter for receiving such contaminated portions, a first connection between said centrifuge and an inlet to said filter, a second connection for conducting a filtrate from an outlet of said filter to said centrifuge; a pressure responsive sludge discharge valve associated with said filter and comprising: a diaphragm connected to said valve; and a compression spring operably associated and adapted to bear against said diaphragm for biasing said valve toward a closed position, said diaphragm being exposed on one side to the pressure of fuel in said first connection and on the other side to the pressure of said filtrate in said second connection, whereby said sludge discharge valve will be opened to discharge sludge from said filter upon a sludge-created stoppage in said filter and a consequent pressure differential across said diaphragm sufficient to overcome said spring means.

3. In an engine fuel purification apparatus of the type having a centrifuge for separating such fuel into a cleansed portion and a portion containing contaminants, a filter for receiving such contaminated portions, a first connection between said centrifuge and an inlet to said filter, a second connection for conducting a filtrate from an outlet of said filter to said centrifuge and a bypass connection between said first and second connections said bypass connection having a check valve therein; a pressure responsive sludge discharge valve associated with said filter and comprising: a diaphragm connected to said valve; and spring means operably associated with said diaphragm for biasing said valve toward a closed position, said diaphragm being exposed on one side to the pressure of fuel in said first connection and the pressure existing upstream from said check valve, and on the other side to the pressure of said filtrate in said second connection and the pressure existing downstream from said check valve, whereby said sludge discharge valve will be opened to discharge sludge from said filter upon a sludge-created stoppage in said filter and a consequent pressure differential across said diaphragm sufficient to overcome said spring means, said check valve being adapted to be opened by a pressure differential thereacross in excess of said pressure differential across said diaphragm.

References Cited in the file of this patent

UNITED STATES PATENTS

| | | |
|---|---|---|
| 1,270,162 | Jay | June 18, 1918 |
| 1,352,961 | Hills | Sept. 14, 1920 |
| 1,412,738 | Heller | Apr. 11, 1922 |
| 1,484,607 | Hunt | Feb. 19, 1924 |
| 1,622,278 | Boyd | Mar. 29, 1927 |
| 1,754,774 | Sharples | Apr. 15, 1930 |
| 1,857,651 | McKinley | May 10, 1932 |
| 2,223,999 | Miller | Dec. 3, 1940 |
| 2,324,763 | Carruthers | July 20, 1943 |
| 2,347,927 | Patterson et al. | May 2, 1944 |
| 2,548,160 | Hunter | Apr. 10, 1951 |
| 2,614,110 | Davis | Oct. 14, 1952 |

FOREIGN PATENTS

| | | |
|---|---|---|
| 258,204 | Great Britain | Sept. 14, 1926 |
| 874,866 | France | Aug. 28, 1942 |